(12) United States Patent
Hebiguchi et al.

(10) Patent No.: US 8,185,048 B2
(45) Date of Patent: May 22, 2012

(54) COMMUNICATION APPARATUS

(75) Inventors: Hiroyuki Hebiguchi, Miyagi-ken (JP); Mitsuharu Nakasato, Miyagi-ken (JP); Makoto Sasaki, Miyagi-ken (JP); Daichi Inoue, Miyagi-ken (JP); Yoshiharu Saito, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 146 days.

(21) Appl. No.: 12/576,198

(22) Filed: Oct. 8, 2009

(65) Prior Publication Data

US 2010/0029203 A1  Feb. 4, 2010

Related U.S. Application Data

(63) Continuation of application No. PCT/JP2008/057520, filed on Apr. 17, 2008.

(30) Foreign Application Priority Data

Apr. 20, 2007  (JP) ................... 2007-111317

(51) Int. Cl.
*H04B 5/00*  (2006.01)

(52) U.S. Cl. ........................................ 455/41.1

(58) Field of Classification Search ............... 455/41.1
See application file for complete search history.

(56) References Cited

U.S. PATENT DOCUMENTS 5,914,701 A  6/1999  Gersheneld et al.
2005/0244166 A1  11/2005  Shinagawa et al.

FOREIGN PATENT DOCUMENTS

| JP | 6-9220 | 2/1994 |
| JP | 11-509380 | 8/1999 |
| WO | 2005/002096 | 1/2005 |

OTHER PUBLICATIONS

Search Report dated May 20, 2008 from International Application No. PCT/JP2008/057250.

*Primary Examiner* — Temesgh Ghebretinsae
*Assistant Examiner* — David Bilodeau
(74) *Attorney, Agent, or Firm* — Beyer Law Group LLP

(57) ABSTRACT

A communication apparatus includes a transmitter configured to supply an information signal as an electric field to a transmission medium; a receiver configured to detect the electric field through the transmission medium to acquire the information signal; an insulating casing that accommodates at least one of the transmitter and the receiver; and a filling member that is arranged at least one of between the casing and the transmitter and between the casing and the receiver.

17 Claims, 4 Drawing Sheets

US 8,185,048 B2

COMMUNICATION APPARATUS

CLAIM OF PRIORITY

This application is a Continuation of International Application No. PCT/JP2008/057520 filed on Apr. 17, 2008, which claims benefit of Japanese Patent Application No. 2007-111317 filed on Apr. 20, 2007, which are hereby incorporated by reference. This application is also related to Japanese Application No. 2008-542120 filed on Sep. 4, 2008, which is the National Phase Application of PCT/JP2008/057520, and now Japanese Patent No. 4256468 registered on Feb. 6, 2009.

BACKGROUND OF THE INVENTION

1. Field of the Invention

The present invention relates to a communication apparatus used in a communication system in which transmission and reception is performed through a transmission medium such as a human body.

2. Description of the Related Art

Due to recent developments in technology, communication methods in which electric fields are induced in the human body or the like (so-called electric field communication) have been proposed as totally new communication methods. An example of such a communication system is disclosed, for example, in PCT Japanese Translation Patent Publication No. 11-509380. In the communication system, a transmitter supplies an electric field corresponding to a modulation signal obtained by modulating an information signal to a human body serving as a transmission medium, and a receiver detects the electric field transmitted through the human body and performs demodulation to obtain the original signal corresponding to the electric field.

In the electric field communication mentioned above, a signal is transmitted by capacitive coupling, instead of causing a through-current to flow to a transmission medium. Thus, it is desirable that the capacitive coupling between a transmission electrode and the transmission medium, the transmission electrode providing a capacitive coupling between the transmission medium and a transmission circuit of a transmitter, and the capacitive coupling between a reception electrode and the transmission medium, the reception electrode providing a capacitive coupling between the transmission medium and a reception circuit of a receiver, be large.

However, in the case that the transmitter or receiver described above is provided in the casing of an electronic apparatus such as a cellular phone, a space is formed between the internal surface of the casing and the transmission electrode of the transmitter or between the internal surface of the casing and the reception electrode of the receiver. Hence, the capacitive coupling between the transmission or reception electrode and a transmission medium is reduced, and a transmission signal thus becomes faint. Furthermore, due to a variation in the space between the internal surface of the casing and the transmission or reception electrode, the signal intensity varies.

SUMMARY OF THE INVENTION

The present invention provides a communication apparatus including a transmitter or receiver for electric field communication and being capable of achieving reliable electric field communication.

A communication apparatus according to an aspect of the present invention includes a transmitter configured to supply an information signal as an electric field to a transmission medium; a receiver configured to detect the electric field through the transmission medium to acquire the information signal; an insulating casing that accommodates at least one of the transmitter and the receiver; and a filling member that is arranged at least one of between the casing and the transmitter and between the casing and the receiver.

With this configuration, since the electrostatic capacitance between a transmission electrode and the transmission medium or between a reception electrode and the transmission medium increases, signal attenuation can be reduced. In addition, since no air-gap is formed between the internal surface of the casing and the transmitter or the receiver, a variation in the signal intensity caused by a variation in the capacitance of an air-gap can be reduced. As a result, reliable electric field communication can be achieved.

Preferably, in the communication apparatus, the filling member is formed of a material having a dielectric constant higher than a dielectric constant of the casing. With this configuration, compared with a case where the internal surface of the casing and the transmitter or the receiver are brought into close contact to each other without forming an air-gap therebetween, signal attenuation can be reduced, thus achieving an excellent communication state.

Preferably, in the communication apparatus, at least one of the transmitter and the receiver accommodated in the casing includes an electrode arranged so as to face an internal surface of the casing with the filling member arranged therebetween. In addition, preferably, part of the internal surface of the casing includes a thin wall portion. With this configuration, since the volume ratio of the filling member can be increased, signal attenuation can be reduced efficiently.

Preferably, in the communication apparatus, at least one of the transmitter and the receiver accommodated in the casing includes an electrode arranged so as to face an internal surface of the casing with the filling member arranged therebetween. In addition, preferably, the filling member is filled in an opening formed in the casing. With this configuration, since the volume ratio of the filling member can be increased, signal attenuation can be reduced efficiently.

Preferably, in the communication apparatus, the transmitter is provided in the casing.

Since a communication apparatus according to an aspect of the present invention includes a transmitter configured to supply an information signal as an electric field to a transmission medium; a receiver configured to detect the electric field through the transmission medium to acquire the information signal; an insulating casing that accommodates at least one of the transmitter and the receiver; and a filling member that is arranged at least one of between the casing and the transmitter and between the casing and the receiver, reliable electric field communication can be achieved.

DESCRIPTION OF THE PREFERRED EMBODIMENTS

Embodiments of the present invention will be described in detail with reference to the accompanying drawings.

Figure 1A:
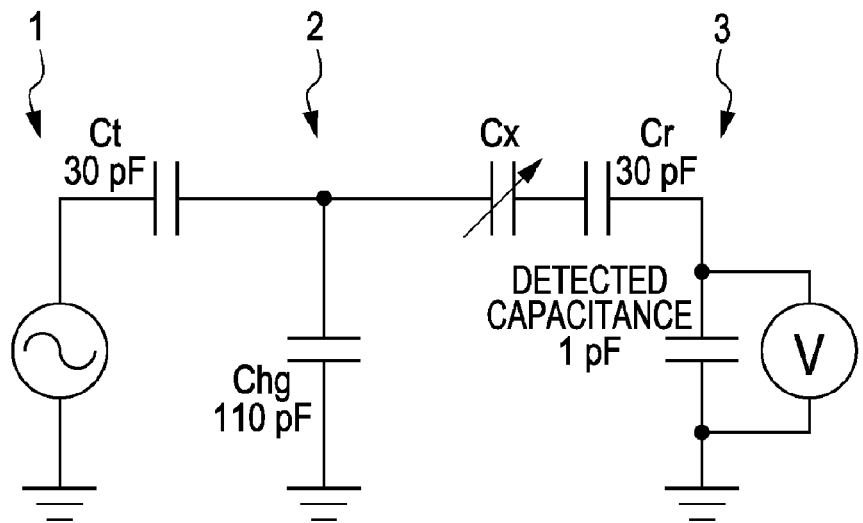
FIG. 1A is an equivalent circuit diagram of a communication system using electric field communication in a case where a receiver is provided in a casing.
Figure 1B:
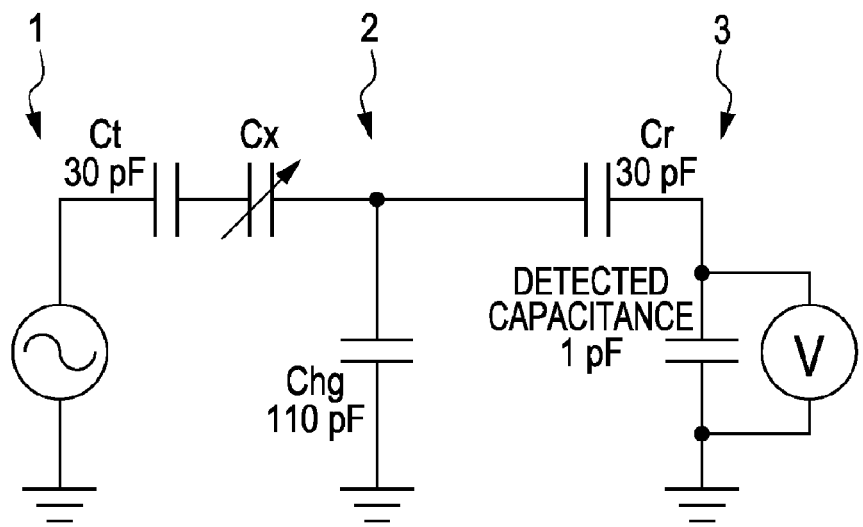
FIG. 1B is an equivalent circuit diagram of the communication system using electric field communication in a case where a transmitter is provided in a casing.

As described above, in a case where a transmitter or a receiver is provided in the casing of an electronic apparatus such as a cellular phone, when a space is formed between the internal surface of the casing and a transmission electrode of the transmitter or between the internal surface of the casing and a reception electrode of the receiver, an unstable capacitance is formed. FIGS. 1A and 1B illustrate equivalent circuits of a communication system using electric field communication. FIG. 1A is an equivalent circuit diagram in a case where a receiver is provided in a casing. FIG. 1B is an equivalent circuit diagram in a case where a transmitter is provided in a casing.

Referring to FIGS. 1A and 1B, a capacitance Ct is formed between a transmitter 1 and a human body 2 serving as a transmission medium, and a capacitance Cr is formed between a receiver 3 and the human body 2. In addition, a capacitance Chg is formed between the human body 2 and the ground, and a capacitance Cx, which is an unstable series capacitance, is formed between the internal surface of the casing and a transmission electrode of the transmitter or between the internal surface of the casing and a reception electrode of the receiver.

In a case where the receiver 3 is provided in the casing of the electronic apparatus, the unstable series capacitance Cx is formed between the internal surface of the casing and the reception electrode of the receiver 3, as shown in FIG. 1A. For example, in a case where the reception electrode of the receiver 3 has an area of 4 square centimeters (2 cm×2 cm) and the casing accommodating the receiver 3 is formed of an acrylonitrile butadiene styrene (ABS) resin having a relative dielectric constant of 3 and a thickness of about 0.3 mm, when the capacitance Chg is assumed to be 110 pF (it is assumed that the feet are fixed to the ground) and the detected capacitance at the receiver 3 is 1 pF, the unstable series capacitance Cx formed in a space of 1 mm or less between the internal surface of the casing and the reception electrode of the receiver 3 is 3 pF or more.

Meanwhile, in a case where the transmitter 1 is provided in the casing of the electronic apparatus, the unstable series capacitance Cx is formed between the internal surface of the casing and the transmission electrode of the transmitter 1, as shown in FIG. 1B. For example, in a case where the transmission electrode of the transmitter 1 has an area of 4 square centimeters (2 cm×2 cm) and the casing accommodating the transmitter 1 is formed of an ABS resin having a relative dielectric constant of 3 and a thickness of about 0.3 mm, when the capacitance Chg is assumed to be 110 pF (it is assumed that the feet are fixed to the ground) and the detected capacitance at the transmitter 1 is 1 pF, the unstable series capacitance Cx formed in a space of 1 mm or less between the internal surface of the casing and the transmission electrode of the transmitter 1 is 3 pF or more.

The inventors of the present invention have focused on the fact that in a case where a transmitter or a receiver for electric field communication is provided in an electronic apparatus, when a space (air-gap) is formed between a transmission electrode of the transmitter and the internal surface of the casing of the electronic apparatus or between a reception electrode of the receiver and the internal surface of the casing of the electronic apparatus, an unstable series capacitance is formed, which inhibits reliable electric field communication. Then, the inventors have found that by filling the air-gap formed between the transmission electrode or the reception electrode and the internal surface of the casing with a dielectric material, the unstable series capacitance can be eliminated and reliable electric field communication can thus be achieved, and have made the present invention based on the finding.

That is, the gist of the present invention is to achieve more reliable electric field communication using a communication apparatus including a transmitter configured to supply an information signal as an electric field to a transmission medium; a receiver configured to detect the electric field through the transmission medium to acquire the information signal; an insulating casing that accommodates at least one of the transmitter and the receiver; and a filling member that is arranged at least one of between the casing and the transmitter and between the casing and the receiver.

Figure 2:
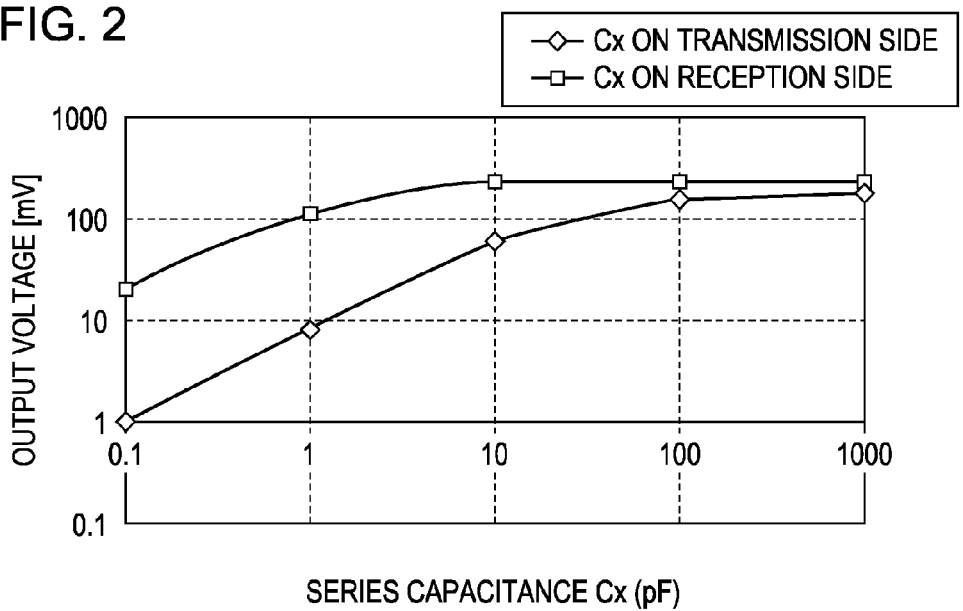
FIG. 2 is a graph showing changes in output voltage when the space between the internal surface of the casing and a transmission electrode of the transmitter and the space between the internal surface of the casing and a reception electrode of the receiver are changed.

Under the conditions shown in FIGS. 1A and 1B, changes in output voltage when the space between the internal surface of the casing and the transmission electrode of the transmitter and the space between the internal surface of the casing and the reception electrode of the receiver were changed were examined. FIG. 2 shows the result of the examination. As is clear from FIG. 2, when a space exists between the internal surface of the casing and the transmission electrode of the transmitter, the space greatly affects output voltage, and thus greatly affects communication. Hence, with the configuration according to an embodiment the present invention, a higher advantage can be achieved when a transmitter is provided in the casing of an electronic apparatus.

Now, a system in which electric field communication is performed will be explained. This system mainly includes a transmission medium, such as a human body, for transmitting an information signal through an electric field; a transmitter configured to supply the information signal as the electric field to the transmission medium; and a receiver configured to detect the electric field through the transmission medium and receive the electric field to acquire the information signal. In this system, electrical capacitive coupling is formed through a capacitor between the transmitter and the transmission medium (for example, a human body) and a capacitor between the receiver and the transmission medium, and an information signal is converted into an electric field and then transmitted through the transmission medium. In this case, since not a stationary current but a displacement current flows to the transmission medium, it is not necessary to establish electric conduction of the transmission medium. Hence, since, for example, even when the transmitter is placed in a pocket, the capacitive coupling between the transmitter and the transmission medium can be formed with a thin cloth located therebetween, transmission of an information signal can be realized.

The transmitter temporarily modulates an information signal in a predetermined modulation method and supplies the modulated information signal as an electric field to the transmission medium. To this end, the transmitter includes a modulation circuit configured to modulate a carrier wave using the information signal; a conversion circuit configured to amplify the modulated signal and convert the amplified signal into a voltage change; and a transmission electrode configured to supply an electric field to the transmission medium.

The receiver detects the electric field through the transmission medium to acquire the information signal. The receiver includes a reception electrode configured to receive an electric field from the transmission medium, the reception electrode facing the transmission medium; a detection circuit configured to amplify and detect the electric field; and a demodulation circuit configured to demodulate the modulated information signal by using the detected physical quantity.

In a case where electric field communication is performed in the system having the configuration described above, the transmitter modulates, using an information signal, a carrier wave having a frequency (within a range from several tens of kHz to several tens of MHz) at which the human body exhibits conductivity. The modulated information signal is amplified and then converted into a voltage change. By applying the voltage change to the electrode of the transmitter, an electric field corresponding to the modulated information signal is generated near the electrode. Then, the electric field is applied to a human body. The electric field applied to the human body is received at the reception electrode of the receiver. When the electric field is applied to the reception electrode, the detection circuit detects the modulated information signal. Then, the demodulation circuit, which is provided downstream the detection circuit, performs demodulation using the carrier wave used in the transmitter to obtain the original information signal. As described above, transmission and reception of an information signal can be performed through a human body serving as a transmission medium. Various modulation methods, such as amplitude modulation (AM), frequency modulation (FM), amplitude-shift keying (ASK), phase-shift keying (PSK), and quadrature shift keying (QSK), may be used as the modulation method described above.

Figure 3:
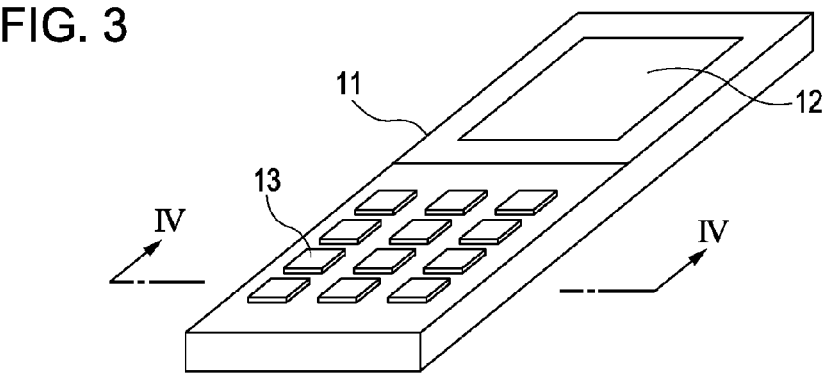
FIG. 3 illustrates an apparatus main body of a communication apparatus according to an embodiment of the present invention.
Figure 4:
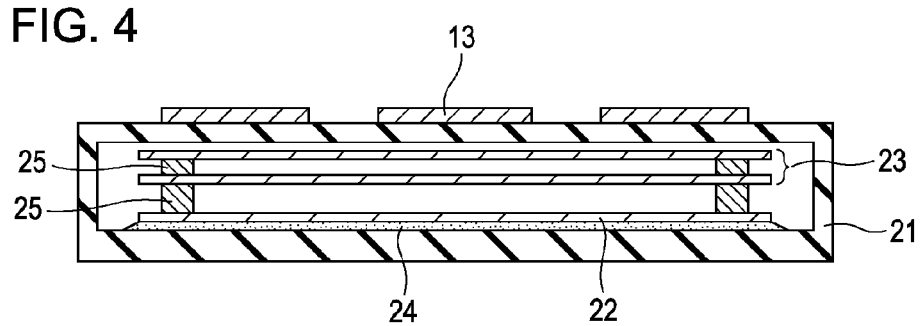
FIG. 4 is a cross-sectional view of the apparatus main body taken along line IV-IV of FIG. 3.

A communication apparatus according to an embodiment of the present invention has a configuration in which a transmitter or a receiver for a system in which the electric field communication described above is performed is provided in the casing of an apparatus main body 11 shown in FIG. 3. The apparatus main body 11 includes a display 12 and an operation buttons 13. FIG. 4 is a cross-sectional view of the apparatus main body 11 taken along line IV-IV of FIG. 3. Referring to FIG. 4, a transmitter is provided in an insulating casing 21. The transmitter mainly includes a transmission electrode 22 and circuit boards 23. Specifically, the transmission electrode 22 is provided on the internal surface of the casing 21 with a filling member 24 arranged therebetween. In addition, the circuit boards 23 are provided on the transmission electrode 22 with spacers 25 arranged therebetween. The transmission electrode 22 is electrically connected to the circuit boards 23. As described above, with the configuration shown in FIG. 4, in a case where the transmitter is provided in the casing 21, a space formed between the internal surface of the casing 21 and the transmission electrode 22 is filled with the filling member 24, so that an unstable capacitance is prevented from being formed between the internal surface of the casing 21 and the transmission electrode 22. Consequently, electric field loss between the internal surface of the casing 21 and the transmission electrode 22 can be reduced to as small as possible.

Since, as described above, the filling member 24 is placed between the internal surface of the casing 21 and the transmission electrode 22, the electrostatic capacitance between the transmission electrode or the reception electrode and the transmission medium increases, thus reducing signal attenuation. Furthermore, since no air-gap is formed between the internal surface of the casing 21 and the transmission electrode 22, a variation in the signal intensity caused by a variation in the capacitance of an air-gap can be reduced. Consequently, reliable electric field communication can be achieved.

It is desirable that a high dielectric material having a relatively high dielectric constant be used as a material of the filling member 24. For example, adhesives, such as an epoxy adhesive (a relative dielectric constant within a range from 2.5 to 6), an acrylic adhesive (a relative dielectric constant within a range from 2.7 to 4.5), a silicone adhesive (a relative dielectric constant within a range from 3.5 to 5), and a urethane adhesive (a relative dielectric constant within a range from 6.5 to 7.1); rubbers, such as a silicone rubber (a relative dielectric constant within a range from 3 to 3.5); resins, such as, an ABS resin (a relative dielectric constant within a range from 2.4 to 4.1) and a urethane resin (a relative dielectric constant within a range from 6.5 to 7.1); and the like may be used as high dielectric constant materials.

In addition, it is desirable that the filling member 24 be formed of a material having a dielectric constant higher than the dielectric constant of the casing 21. With this arrangement, signal attenuation can be reduced and an excellent communication state can be achieved compared with a case where the internal surface of the casing 21 and the transmission electrode 22 are brought into close contact to each other without forming an air-gap therebetween. For example, in a case where the casing 21 is formed of an ABS resin having a relative dielectric constant of 3, a material having a relative dielectric constant of 4 or more is selected as a material of the filling member 24.

In addition, a conductive material having a relatively high conductivity may be used as a material of the filling member 24. For example, conductive adhesives, such as an epoxy conductive adhesive and a polyimide conductive adhesive, a silver paste, and the like may be used as high-conductivity materials.

Figure 5A:
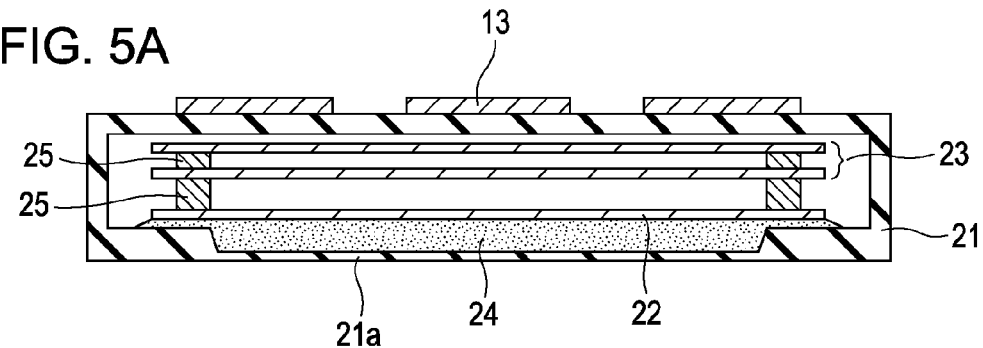
FIGS. 5A to 5D are illustrations showing other examples of a communication apparatus according to an embodiment of the present invention.
Figure 5B:
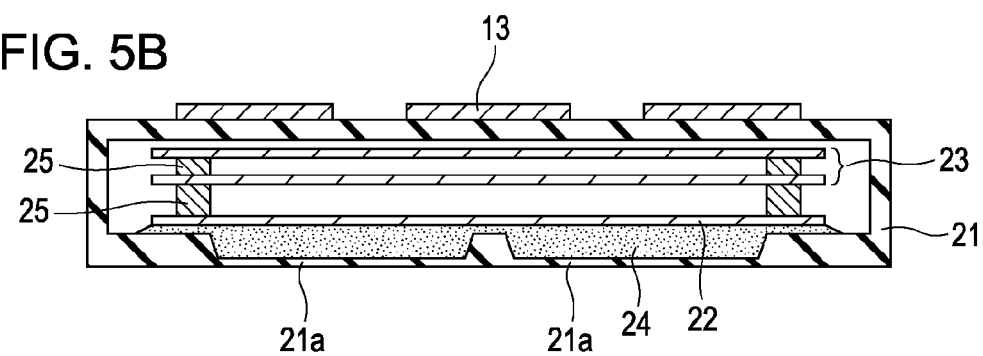

FIGS. 5A to 5D are illustrations showing other examples of a communication apparatus according to an embodiment of the present invention. Referring to FIGS. 5A and 5B, the transmission electrode 22 of the transmitter accommodated in the casing 21 faces the internal surface of the casing 21 and part of the internal surface of the casing 21 includes a thin wall portion 21a. The filling member 24 is filled in an area including the thin wall portion 21a. That is, the thin wall portion 21a is provided on the internal surface of the casing 21, and the transmission electrode 22 is provided on the internal surface of the casing 21 with the filling member 24 arranged therebetween in the area including the thin wall portion 21a. As described above, since the thin wall portion 21a is provided in the area of the casing 21 that faces the transmission electrode 22 and the filling member 24 is filled in the thin wall portion 21a, the volume ratio of the filling member 24 can be increased, thereby efficiently reducing signal attenuation.

Figure 5C:
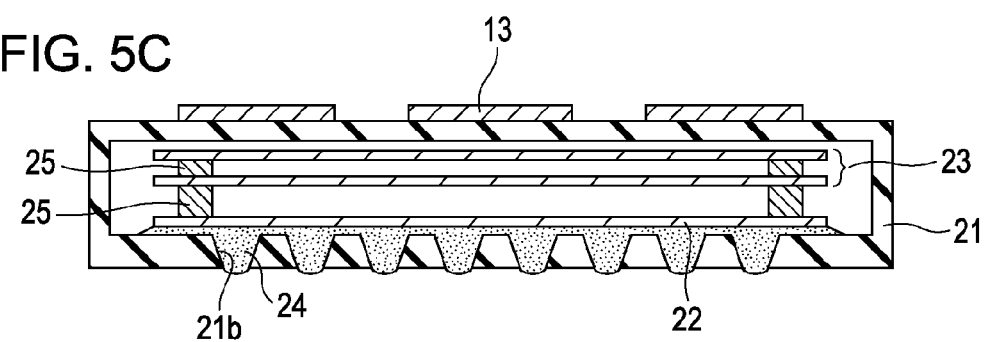

Referring to FIG. 5C, the transmission electrode 22 of the transmitter accommodated in the casing 21 faces the internal surface of the casing 21 and the internal surface includes an opening 21b. The filling member 24 is filled in the opening 21b, and the filling member 24 is exposed to the outside of the casing 21. That is, the opening 21b is provided in the casing 21, and the transmission electrode 22 is provided on the internal surface of the casing 21 with the filling member 24 arranged therebetween in the opening 21b. As described above, since the opening 21b is provided in the area of the casing 21 that faces the transmission electrode 22 and the filling member 24 is filled in the opening 21b, the volume ratio of the filling member 24 can be increased, thereby efficiently reducing signal attenuation.

Figure 5D:
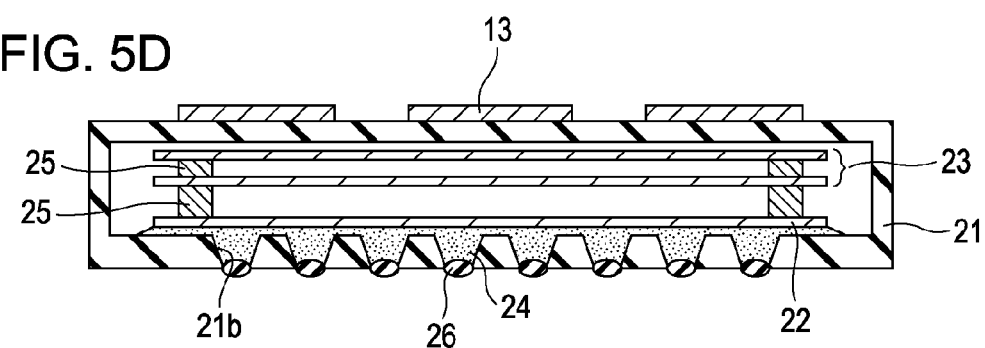

In a case where the filling member 24 is filled in the opening 21b, when a conductive material is used as a material of the filling member 24, it is not necessary to cause the transmission electrode 22 and a human body serving as a transmission medium to be brought into conduction with each other. Thus, as shown in FIG. 5D, the filling member 24 formed of a conductive material may be covered with an insulating material 26.

An example performed in order to clarify advantages of the present invention will be explained.

Figure 6:
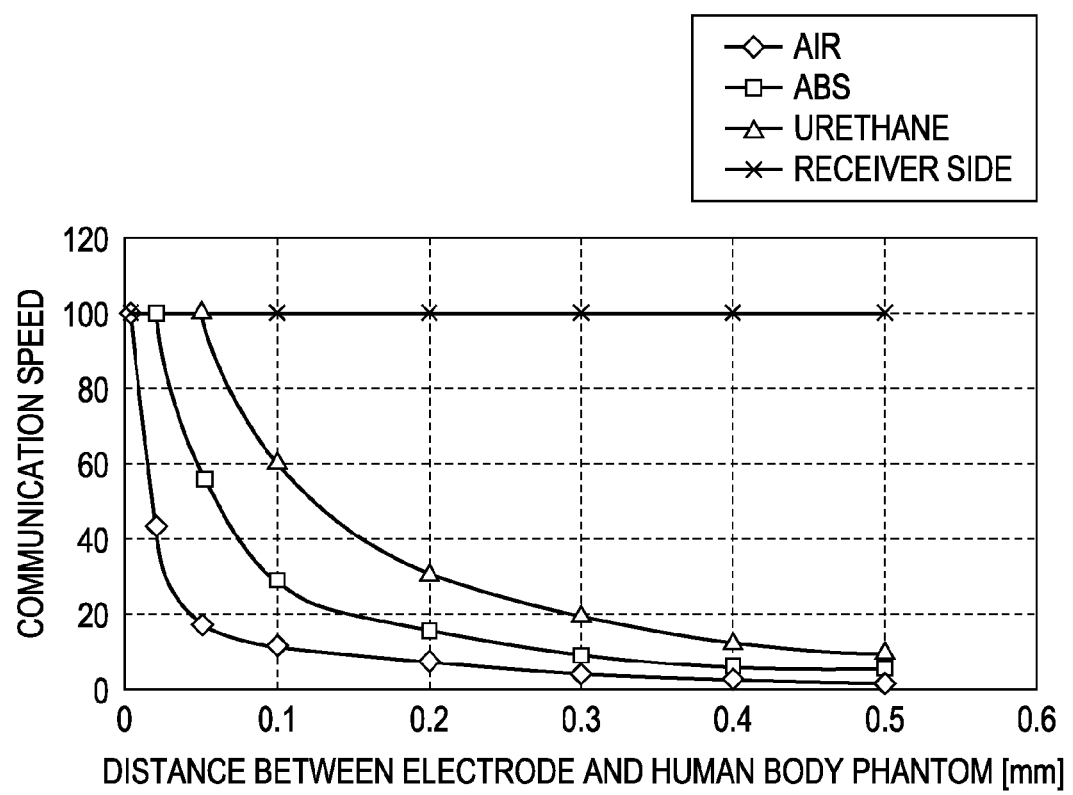
FIG. 6 is a characteristic diagram showing the relationship between the communication speed and the distance between an electrode and a human body.

Data communication was performed using electric field communication while a material arranged between a transmission electrode of a transmitter and a human body phantom (model) was changed, and a reduction in the communication speed according to the distance between the transmission electrode and the human body phantom was examined. In addition, a reduction in the communication speed according to the distance between a reception electrode of a receiver and the human body phantom was also examined. FIG. 6 shows the examination results. The communication speed was measured at a carrier frequency of 10 MHz and a signal amplitude of 1 Vp-p. For the ordinate of FIG. 6, standardization was performed by setting the communication speed when the electrodes and the human body phantom were in close contact to each other to 100%.

As is clear from FIG. 6, even an air-gap of about 0.5 mm formed between the reception electrode and the human body phantom did not affect the communication speed. Concerning an air-gap formed between the transmission electrode and the human body phantom, the communication speed reduced to 44% in the case of an air-gap of 0.02 mm, reduced to 17% in the case of an air-gap of 0.05 mm, and reduced to 8% in the case of an air-gap of 0.1 mm (see the characteristic curve of air (a relative dielectric constant of 1) in FIG. 6). Meanwhile, by arranging an ABS resin having a relative dielectric constant of 3 between the transmission electrode and the human body phantom, the communication speed recovered from 17% to 53% in the case of an air-gap of 0.05 mm, and recovered from 8% to 27% in the case of an air-gap of 0.1 mm. In addition, by arranging a urethane resin having a relative dielectric constant of 7 between the transmission electrode and the human body phantom, the communication speed recovered from 17% to 100% in the case of an air-gap of 0.05 mm, and recovered from 8% to 62% in the case of an air-gap of 0.1 mm. As described above, by arranging a filling member between an electrode and a human body phantom, the communication speed was prevented from being reduced, and stabilization of electric field communication was thus achieved. In particular, it was found that a higher effect can be achieved by using a material having a high dielectric constant as a material of the filling member.

The present invention is not limited to the embodiment described above and various changes can be made to the present invention. For example, although the case where a transmitter is provided in the casing of an apparatus main body has been explained in the foregoing embodiment, the present invention is not limited to this. The present invention can also be applied in a similar manner to the case where a receiver is provided in the casing of an apparatus main body. In addition, sizes, values, and the like set in the foregoing embodiment are not particularly limited. The sizes, values, and the like can be changed within the range of the present invention. Furthermore, various changes can be made to the present invention in an appropriate manner without departing from the scope of the present invention.

What is claimed is:

1. A communication apparatus comprising:
    a transmitter configured to supply an information signal as an electric field to a transmission medium;
    a receiver configured to detect the electric field through the transmission medium to acquire the information signal;
    an insulating casing that accommodates at least one of the transmitter and the receiver; and
    a filling member that is arranged at least one of between an internal surface of the casing and the transmitter accommodated in the casing and between the internal surface of the casing and the receiver accommodated in the casing,
    wherein at least one of the transmitter and the receiver accommodated in the casing includes an electrode arranged so as to face the internal surface of the casing,
    wherein the filling member fills a gap between the electrode and the internal surface of the casing, and
    wherein part of the casing facing the electrode includes a thin wall portion such that a volume ratio of the filling member with respect to the casing between the electrode and the internal surface is increased.

2. The communication apparatus according to claim 1, wherein the filling member is formed of a material having a dielectric constant higher than a dielectric constant of the casing.

3. The communication apparatus according to claim 1, wherein the transmitter is provided in the casing.

4. The communication apparatus according to claim 1, wherein the filling member further fills an opening formed in the casing.

5. The communication apparatus according to claim 1, wherein the receiver is provided in the casing.

6. A receiver that detects an electric field through a transmission medium to acquire an information signal, comprising:
    a receiver circuit and an electrode;
    an insulating casing that accommodates the receiver circuit and the electrode; and
    a filling member that is arranged between an internal surface of the casing and the electrode,
    wherein the electrode is arranged so as to face the internal surface of the casing;
    wherein the filling member fills a gap between the electrode and the internal surface of the casing, and
    wherein part of the casing facing the electrode includes a thin wall portion such that a volume ratio of the filling member with respect to the casing between the electrode and the internal surface is increased.

7. The receiver according to claim 6, wherein the filling member is formed of a material having a dielectric constant higher than a dielectric constant of the casing.

8. The receiver according to claim 6,
    wherein the filling member further fills in an opening formed in the casing.

9. A transmitter that supplies an information signal as an electric field to a transmission medium, comprising:
    a transmitter circuit and an electrode;
    an insulating casing that accommodates the transmitter circuit and the electrode; and
    a filling member that is arranged between an internal surface of the casing and the electrode,
    wherein the electrode is arranged so as to face an internal surface of the casing, and wherein the filling member fills a gap between the electrode and the internal surface of the casing, and wherein part of the casing facing the electrode includes a thin wall portion such that a volume ratio of the filling member with respect to the casing between the electrode and the internal surface is increased.

10. The transmitter according to claim 9, wherein the filling member is formed of a material having a dielectric constant higher than a dielectric constant of the casing.

11. The transmitter according to claim 9,
wherein the filling member further fills an opening formed in the casing.

12. The communication apparatus according to claim 1, wherein the filling member has a dielectric constant higher than a dielectric constant of air so as to increase a capacitive coupling between the electrode and the transmission medium.

13. The communication apparatus according to claim 1, wherein the filling member is formed of a material having a dielectric constant higher than a dielectric constant of the casing such that the increased volume ratio of the filling member increases a capacitive coupling between the electrode and the transmission medium.

14. The receiver according to claim 6, wherein the filling member has a dielectric constant higher than a dielectric constant of air so as to increase a capacitive coupling between the electrode and the transmission medium.

15. The receiver according to claim 6, wherein the filling member is formed of a material having a dielectric constant higher than a dielectric constant of the casing such that the increased volume ratio of the filling member increases a capacitive coupling between the electrode and the transmission medium.

16. The transmitter according to claim 9, wherein the filling member has a dielectric constant higher than a dielectric constant of air so as to increase a capacitive coupling between the electrode and the transmission medium.

17. The transmitter according to claim 9, wherein the filling member is formed of a material having a dielectric constant higher than a dielectric constant of the casing such that the increased volume ratio of the filling member increases a capacitive coupling between the electrode and the transmission medium.

* * * * *